United States Patent [19]

Lesk

[11] Patent Number: 5,905,505
[45] Date of Patent: *May 18, 1999

[54] METHOD AND SYSTEM FOR COPY PROTECTION OF ON-SCREEN DISPLAY OF TEXT

[75] Inventor: Michael E. Lesk, Mountainside, N.J.

[73] Assignee: Bell Communications Research, Inc., Morristown, N.J.

[21] Appl. No.: 08/716,677

[22] Filed: Sep. 13, 1996

Related U.S. Application Data

[60] Provisional application No. 60/017,289, May 13, 1996.

[51] Int. Cl.$^6$ ..................................................... G06F 15/00
[52] U.S. Cl. ............................................................ 345/435
[58] Field of Search ................................. 345/435, 113, 345/114, 115, 116, 117

[56] References Cited

U.S. PATENT DOCUMENTS

| | | | |
|---|---|---|---|
| 4,539,585 | 9/1985 | Spackoua et al. | 358/93 |
| 4,731,743 | 3/1988 | Blancato | 345/435 |

OTHER PUBLICATIONS

Elizabeth Corcoran, In Hot Pursuit of Software Pirates, Washington, Post, Aug. 23, 1995, at F1.

N. Komatsu and H. Tominaga, A Proposal on Digital Watermark in Document Image Communication and its Application to Realizing a Signature, Electronics and Communication in Japan, Part 1 (Communications), vol. 73, No. 5, 1990, at 22–23.

K. Matsui and K. Tanaka, Video–Steganography: How to Secretly Embed a Signature in a Picture, Technological Strategies for Protecting Intellectual Property in the Networked Multimedia Environment, Jan. 1994, at 187–206.

Michael Lesk, How Can Digital Information Be Protected, Research Challenges in the Economics of Information, CNRS, Jul. 1993.

J.T. Brassil, S. Low, N. Maxemchuk, and L. O'Gorman, Marking of Documents Images with Code–Words to Deter Illicit Dissemination, Proc. INFOCOM 94 Conference on Cumputer Communications, 194, at 1278–87.

Steve Lohr, Pirates are Circling The Good Ship Windows 95, New York Times, Aug. 24, 1995, at D6.

*Primary Examiner*—Phu K. Nguyen
*Attorney, Agent, or Firm*—Joseph Giordano; David A. Hey; Loria B. Yeadon

[57] ABSTRACT

Method and system for preventing copying of textual images during display on a screen. The method includes randomly adding bits to the bitmapped background of the textual image to produce two random bitmapped textual images. The random bitmapped images are then alternately displayed on the screen so that the instantaneous display of the on screen textual images is unreadable. By a second method, the bits that form the bitmapped image of the text bits are randomly modified to produce a pair of random bitmapped texts. The random bit mapped text pairs are then alternately flickered on the display screen. Again, by this second method, the instantaneous display of the on screen textual images is unreadable. Although in both cases the instantaneous display is unreadable, the human eye averages the two different bitmapped images as they alternate on screen so that the text is human readable.

24 Claims, 9 Drawing Sheets

FIG. 4A

Piece out our imperfections
with your thoughts:
Into a thousand parts
divide one man,
And make imaginary puissance
Think, when we talk of
horses, that you see them,
Printing their proud hoofs
in the receiving earth:
For 'tis your thoughts
that now must deck, our kings,

Piece out our imperfections
with your thoughts:
Into a thousand parts
divide one man,
And make imaginary puissance
Think, when we talk of
horses, that you see them,
Printing their proud hoofs
in the receiving earth:
For 'tis your thoughts
that now must deck, our kings,

**Piece out our imperfections
with your thoughts:
Into a thousand parts
divide one man,
And make imaginary puissance
Think, when we talk of
horses, that you see them,
Printing their proud hoofs
in the receiving earth:
For 'tis your thoughts
that now must deck, our kings,**

FILE   EDIT   VIEW   GO   BOOKMARKS   OPTIONS   DIRECTORY   WINDOW   HELP

[BACK] [FORWARD] [HOME] [RELOAD] [IMAGES] [OPEN] [PRINT] [FIND] [STOP]   N

[WHAT'S NEW] [WHAT'S COOL] [HANDBOOK] [NET SEARCH] [NET DIRECTORY] [SOFTWARE]

STANDING LEVEL
[NONE] [LOW] [MEDIUM] [HIGH]

CHOOSE FILE TO DISPLAY
[CATECHISM]
[SHAKESPEARE]
[LACKAWANNA]
[MOBY DICK]
[MOBY DICK 25%]
[PRIDE AND PREJUDICE]

TYPE PASSWORD: ####

OLLNRMTH

Xzoo nv Rhsnzvo. Hlnv bvzih ztl--mvevi nrmw sld olmt
kivxrhvob  --szermt orggov li ml nlmvb rm nb kfihv, zmw
mlgsrmt kzigrxfozi gl rmgvivhg nv lm hsliv, R gslftsg
R dlfow hzro zylfg z orggov zmw hvv gsv dzgvib kzig lu gsv
dliow. Rg rh z dzb R szev lu wirermt luu gsv hkovvm, zmw
ivtfozgrmt gsv xrixfozgrlm. Dsvmvevi R urmw nbhvou tildrmt
tirn zylfg gsv nlfgs;  dsvmvevi rg rh z wznk, wiraaob
Mlevnyvi rn nb hlfo;  dsvmvevi R urmw nbhvou rmelofmgzirob
kzfhrmt yvuliv xluurm dzivslfhvh, zmw yirmtrmt fk gsv ivzi
lu vevib ufmvizo R nvvg;  zmw vhkvxrzoob dsvmvevi nb sbklh
tvg hfxs zm fkkvi szmw lu nv, gszg rg ivjfrivh z hgilmt
nlizo kirmxrkov gl kivevmg nv uiln wvoryvizgvob hgvkkrmg
rmgl gsv hgivvg, zmw nvgslwrxzoob pmlxprmt kvlkov'h szgh
luu--gsvm, R zxxlfmg rg srts grnv gl tvg gl hvz zh hllm zh
R xzm. Gsrh rh nb hfyhgrgfgv uli krhglo zmw yzoo. Drgs z
ksrolhlksrxzo uolfirhs Xzgl gsildh srnhvou fkln srh hdliw;
R jfrvgob gzpv gl gsv hsrk.

FIG. 8

```
FILE   EDIT   VIEW   GO   BOOKMARKS   OPTIONS   DIRECTORY   WINDOW          HELP
```

[BACK] [FORWARD] [HOME] [RELOAD] [IMAGES] [OPEN] [PRINT] [FIND] [STOP]   [N]

[WHAT'S NEW] [WHAT'S COOL] [HANDBOOK] [NET SEARCH] [NET DIRECTORY] [SOFTWARE]

DEGREE OF PARANOIA                                CHOOSE FILE TO DISPLAY

[NONE] [LOW] [MEDIUM] [HIGH]                      [CATECHISM]
         34                                       [SHAKESPEARE]
                                                  [LACKAWANNA]
                                                  [MOBY DICK]
                                    35            [MOBY DICK 25%]
                                                  [PRIDE AND PREJUDICE]

LOOMINGS

CALL ME ISHMAEL. SOME YEARS AGO--NEVER MIND HOW LONG
kivxrhvob  --szermt orggov li ml nlmvb rm nb kfihv, zmw
mlgsrmt kzigrxfozi gl rmgvivhg nv lm hsliv, R gslftsg
R dlfow hzro zylfg z orggov zmw hvv gsv dzgvib kzig lu gsv
dliow.  Rg rh z dzb R szev lu wirermt luu gsv hkovvm, zmw
ivtfozgrmt gsv xrixfozgrlm. Dsvmvevi R urmw nbhvou tildrmt
tirn zylfg gsv nlfgs;  dsvmvevi rg rh z wznk, wiraaob
Mlevnyvi rm nb hlfo;  dsvmvevi R urmw nbhvou rmelofmgzirob
kzfhrmt yvuliv xluurm dzivslfhvh, zmw yirmtrmt fk gsv ivzi
lu vevib ufmvizo R nvvg;  zmw vhkvxrzooob dsvmvevi nb sbklh
tvg hfxs zm fkkvi szmw lu nv, gszg rg ivjfrivh z hgilmt
nlizo kirmxrkov gl kivevmg nv uiln wvoryivzgvob hgvkkrmt       36
rmgl gsv hgivvg, zmw nvgslwrxzoob pmlxprmt kvlkov'h szgh
luu--gsvm, R zxxlfmg rg srts grnv gl tvg gl hvz zh hllm zh
R xzm. Gsrh rh nb hfyhgrgfgv uli krhglo zmw yzoo.  Drgs z
ksrolhlksrxzo uolfirhs Xzgl gsildh srnhvou fklm srh hdliw;
R jfrvgob gzpv gl gsv hsrk.

METHOD AND SYSTEM FOR COPY PROTECTION OF ON-SCREEN DISPLAY OF TEXT

RELATED APPLICATION

This application claims the benefit of U.S. Provisional Application No. 60/017,289 filed on May 13, 1996 and entitled "On Screen Copyright Protection."

FIELD OF THE INVENTION

The invention relates to the field of computer generated text displayed on monitors, specifically involving the protection from copying, in a useful format, of information displayed on a computer screen. The invention uses alternating background bitmaps that are not prominently perceived by the human eye and other methods to prevent copying of useful screen information.

BACKGROUND OF THE INVENTION

Historically, a key problem in protecting copyrighted works online has been that, even if the user is forced to read something using a particular program, the letters on the screen can always be captured by the user "screenscraping" and then reusing the material without the publisher's knowledge. As a result, publishers are often afraid of providing online information for fear that it will be stolen and reused. Computer scientists give talks with phrases like "the nationwide file system," and publishers fear that this means that everyone in the country, or perhaps the world, will be able to access one electronic copy of their material, and as a result, the first sale will be the only one.

Further, publishers remember the collapse of the software game market in the early 1980s due to illegal copying, and are aware of the software piracy problems in many countries. The Software Publisher's Association estimates that piracy costs the software industry $15 billion per year. See, for example, Elizabeth Corcoran, *In Hot Pursuit of Software Pirates*, Washington Post, Aug. 23, 1995, at F1. In some countries, more than 95% of the copies of software in use are illegally made, with almost no legal copies in use. Worse yet, others are re-exporting illegal copies, cutting into the software market in places that have made great progress at eliminating locally made illegal copies. Book publishers are afraid of the same thing happening to them and are looking for a technological fix.

Traditionally, the large databases have avoided the worst of these problems by their method of operation. Users of a system like NEXIS or Dialog may well be able to capture a screenfull of output, representing a single article or abstract; but they are not likely to be able to find somebody else who wants that particular item and is willing to pay for it. Thus, piracy of such a system, which provides only the tiniest fraction of its content on each interaction, is not an insuperable problem.

Book publishers, however, who would like to deliver an entire book online, do not feel that same confidence. They know that an undergraduate who has purchased the right to a textbook for one of his classes, for example, has easy access to his fellow students who also need the same textbook, and they fear unauthorized duplication. Current statistics on library theft, for example, would not reassure them as to the honesty of current undergraduates. These concerns for online display are also applicable to display provided by a compact disk, read-only memory (CD-ROM).

The techniques of "digital watermarking" or "steganography" are often recommended to deal with this problem. These methods involve the concealment of a special code within a digital object; this code does not interfere with reading or viewing the object, but can be used to track copies. See N. Komatsu and H. Tominaga, *A proposal on digital watermark in document image communication and its application to realizing a signature*, Electronics and Communications in Japan, Part 1 (Communications), vol. 73, no. 5, 1990, at 22–23.

With watermarks, each copy sold is labeled with a different identification number, and illegal copies can thus be tracked back to the original purchaser so that legal remedies may be sought against that purchaser. However, these codes may be easily removed, and they may be hard to insert. See K. Matsui and K. Tanaka, *Video-Steganography: How to Secretly Embed a Signature in a Picture*, Technological Strategies for Protecting Intellectual Property in the Networked Multimedia Environment, January 1994, at 187–206. Unfortunately, even if the proposed law against protection-breaking software passes, it is going to be hard to outlaw low-pass spatial Fourier transforms, which would attack many of the proposed picture labeling schemes. Further, it is easier to find spare places to put extra bits in a picture (where low-order detail can be adjusted with little notice) than in text, and thus the watermark method has little use with text.

The most serious difficulty with digital watermarking for those who wish to display text is that it is particularly hard to find a way to put such codes in ASCII text. For this reason there have been suggestions that publishers wishing to send ordinary text should code it as bitmaps and send those despite their greater bulk. See M. Lesk, *How Can Digital Information Be Protected*, Research Challenges in the Economics of Information, CNRS, July 1993. Perhaps the most imaginative solution is that of J. T. Brassil, et al., at Bell Laboratories, which used such techniques as adjusting the space between letters and words in Postscript to hide extra codes. If the user copies the exact bitmap, this will permit tracking of the copy. See J. T. Brassil, S. Low, N. Maxemchuk, and L. O'Gorman, *Marking of Document Images with Code-words to Deter Illicit Dissemination*, Proc. INFOCOM 94 Conference on Computer Communications, 1994, at 1278–87.

Digital watermarking also does not actually prevent copying; it merely makes it possible to track the source of an illegal copy back to the first purchaser. However, since the Business Software Alliance estimates that 90% of illegal software use in the United States is unorganized and individual, any legal action against the copiers may well be expensive and unrewarding. See Steve Lohr, *Pirates Are Circling The Good Ship Windows 95*, New York Times, Aug. 24, 1995, at D6. It is for this reason, of course, that the proposed White Paper on "Intellectual Property and the National Information Infrastructure (NII)" suggests that online service providers be responsible for policing copyright violation; however, it remains to be seen whether this will be enacted. For the moment, legal techniques are expensive when used against a myriad of individuals, many of whom may have small financial resources.

Another technique used in the software industry to control illegal use of software is the "dongle," a special-purpose hardware device that must be present on the machine involved for the software to work. These devices are relatively cheap and prevent software from running on a different processor. However, these devices meet some consumer resistance since they prevent someone from moving their work quickly from one machine to another (as is of course their intent) and also just seem to produce a higher level of hassle for users than software alone.

Although transmitting bitmaps and controlling the software and or hardware that is used to display them help prevent people from copying the material they access, these methods do not provide a complete solution. The user can always just take a screen dump, capture the bits off the screen, and run these bits through an optical character recognition (OCR) program. The publisher will then be thrown back on legal remedies for copyright violation.

SUMMARY OF THE INVENTION

It is an object of the invention to overcome the limitations and drawbacks of prior techniques for preventing unauthorized copying. In fulfillment of this object, and others, the present invention provides a way for the human eye to see something and read it without allowing capture of the information by screen dumping. The invention accomplishes this task by alternately and rapidly displaying text combined with varied backgrounds of interfering information.

The invention comprises a program that displays text on a screen in such a way that the text may be recognized by the human eye, but it may not be captured with a screen dump. The invention addresses the problem of protecting displayed text, at some cost in readability, by flickering the text with a varying background bitmap—an admixture of background grey noise. The human eye sorts out the text, not paying close attention to the grey background; but any screen dump captures at a given instant both the text and the noise. Additional protection is provided by scrolling the text up and down slowly, which again the human eye can track, but which would frustrate a program trying to unlock the text by averaging the flickering aspect of the invention.

Additional objects, advantages and novel features of the invention will be set forth in part in the description which follows, in part will become more apparent to those skilled in the art upon examination of the following, or may be learned by practice of the invention. The objects and advantages of the invention may be realized and attained by means of the instrumentalities and combinations particularly pointed out in the appended claims.

To achieve the stated and other objects of the present invention, as embodied and described below, the invention may comprise the steps of:

generating a first background random bitmap;

generating a second background random bitmap possibly derived from the first background random bitmap;

adding said first background to the selected image to create a first combined image;

adding said second background to the selected image to create a second combined image;

displaying, alternately and in succession on a display device, the first combined image and the second combined image such that said selected image is recognizable to the human eye.

BRIEF DESCRIPTION OF THE DRAWINGS

FIGS. 4A to 4C illustrate the effect of varying half-images of the letters, rather than the background in accordance with another embodiment of the invention.

FIGS. 6 and 7 are diagrams of user interfaces containing the preferred embodiment for displaying an image in accordance with an embodiment of the invention.

FIG. 8 is a diagram of a user interface containing the preferred embodiment for displaying an image in accordance with an embodiment of the invention.

DETAILED DESCRIPTION OF THE PREFERRED EMBODIMENT

Figure 1:
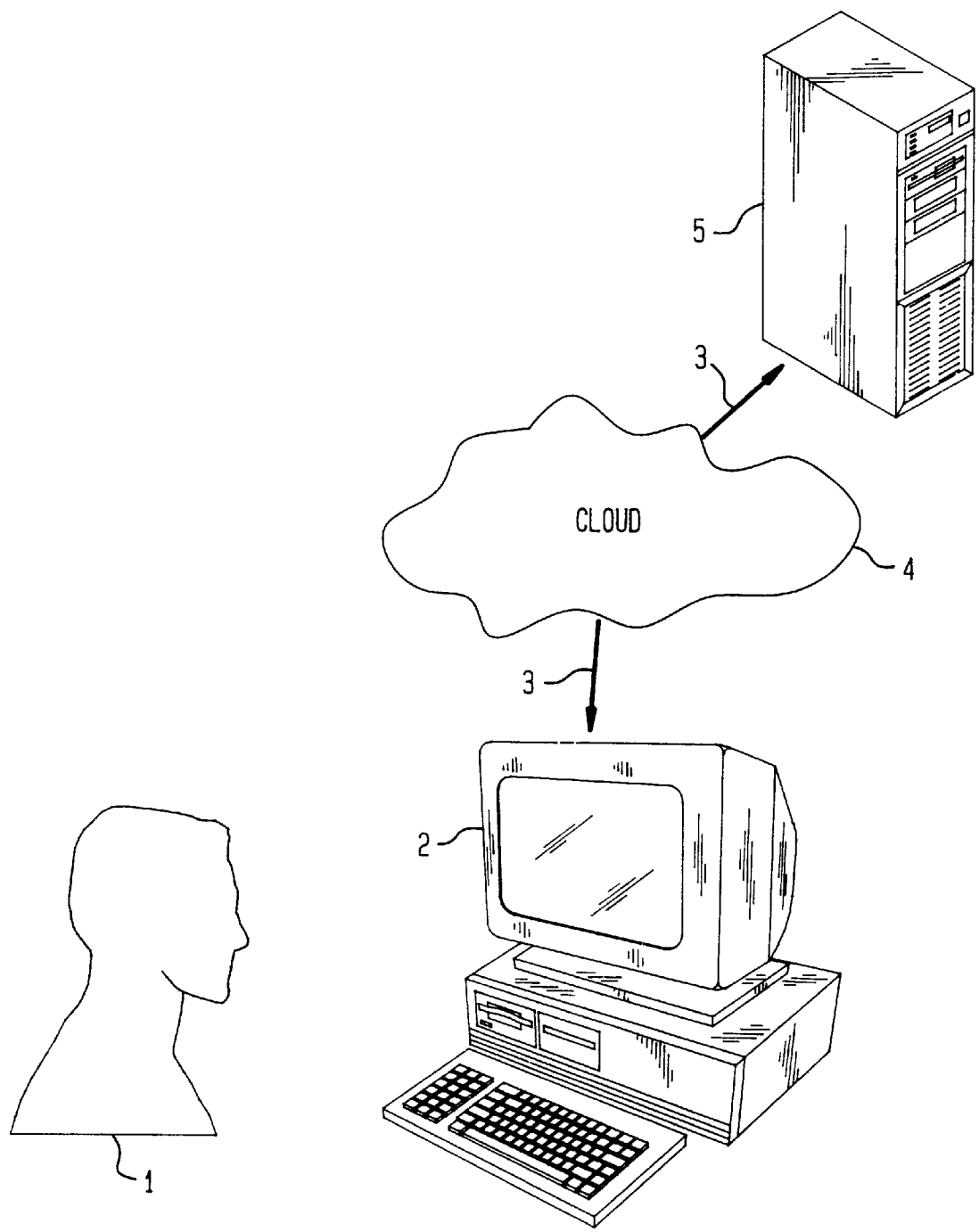
FIG. 1 is an illustration of a system for displaying a selected image in accordance with an embodiment of the invention.

Using the drawings, the preferred embodiment of the present invention will now be explained.

As is known from movies and television, if the eye is presented with images changing 24 to 30 times per second, respectively, it tries to average the result, rather than perceive the separately changing images (as it would if the images changed every second or every two seconds).

Computer screen dumps, on the other hand, capture an instantaneous appearance of the screen. These dumps do not incorporate any time averaging over the screen appearance. Thus, if random bits are added to the background of the text to be displayed, and this process is repeated several times, resulting bitmaps are created that contain all the bits in the letters plus perhaps 50% of the remaining bits, at random, turned on within each bitmap. If these bitmaps are rapidly alternated, the human eye will perceive the steady bits making up the letters as letters, but will see the irregular flickering bits in the background as equivalent to a 50% grey background. Thus the eye will perceive steady black letters on a grey background. Any screen dump that is attempted, however, will capture the enormous amount of background bits as "garbage" because the screen dump will capture only one or the other of the images; the resulting screen image will be almost useless.

With the invention, the number of background bitmaps may be varied. Also, one background bitmap may be generated from others by bit inversion or other operations. However, it may not be desirable to have too many background bitmaps. For example, if a method of attacking the screen protection is to capture the images and try to logically "and" them to uncover the letters (similar to what happens when your eye averages the background as grey), the more random the backgrounds that are used, the more likely it is that the letters will be apparent from using the "and" function (i.e., higher density of random background produces more likelihood of elimination of that background, since only the letters themselves will be constantly present). As another method to defeat this strategy, it is also possible to combine the idea of flickering backgrounds and flickering letters, with perhaps a 25% background and a 75% letter density.

Another feature that can be added to the invention is to "wobble" the text up and down the screen slowly. This doesn't bother the reader as much as the flickering, and it defeats a user who might say "I can defeat this program by setting up something which will just make 100 screen dumps in succession and then average the result." With the text wandering up and down the screen, the averaging will be destroyed.

As a further element in designing a system using the algorithm of the invention, it is assumed that the more obvious steps in copyright protection will be taken in conjunction with the invention. For example, the text to be read should be transmitted in encrypted form to the user's machine, so that "packet-sniffers" recording the content of the packets moving to the machine won't get anything useful. This requires the user to employ a utility written by the information provider to display the file, which incorporates the decryption step, so that the decrypted text is not written anywhere on a file in the user's machine. The actual display should be done in a bitmap window, which can be within a network browser, such as Netscape, if a plug-in, such as a JAVA program, is used.

This technology does not work as well with displays of pictures rather than text, except for line drawings or other high-contrast art (e.g., art of only black and white elements; art of only two colors, such as red and green). Without the familiar letter-shapes to guide the eye, the addition of noise to, for example, a photograph of a real scene, which will typically contain many shades, makes it considerably noisier, rather than simply giving the image the appearance of being on a grey "background." However, the digital watermarking techniques are applicable exactly to such a pictorial images. Thus, the flickering technique is applicable exactly when the watermarking techniques are not and fills an important slot in copyright defense technology.

Difficulties with the invention include the inability of current technology to flicker quite fast enough, or to display small enough dots. For example, on a Sparc 10, maximum rates of about 30 images per second running with C code for X-windows may be used; ideally, however, a proper rate would double the Sparc 10 rate. Running under JAVA, the flicker rate ranges from about 20 to 40 images/second (even on windows of about 600×100 pixels). In addition, each dot on a modern screen is still large enough to be easily perceived; the preferred embodiment uses smaller dots, so that they blend more easily. With time, both of these difficulties should be swept away by increasing hardware capability.

An additional option for addressing some of these difficulties is the use of an alternating pair of colors for each bit of the screen, rather than black and white. As observed by Dr. Donald Norman, composing images from colored bits and using only a single pair of colors, such as green and red, rather than using black and white, allows the use of lower alternation rates because the human eye recognizes these colors more slowly than black and white.

This technology thus makes it possible for copyright owners to display works to users while simultaneously preventing them from downloading the works. By doing so, it should enable additional kinds of material to be safely offered on online services.

The preferred embodiment when applying the invention to text uses a Unix X-windows program that starts with a bitmap of letters, exactly as they would normally be put on the screen. These can be made easily enough from text using any typesetting-type program. For each bitmap to be displayed, two random bitmaps with grey density 25% are made. That is, one bit out of four is dark (all bits are either black or white). These bitmaps may then be "or"-ed with the text bitmaps, so that two bitmaps are created, each of which contains the original text plus 25% of the white space cluttered up with more dark bits. The program then switches quickly between the two bitmaps. The text bits are contained in both examples, so the eye sees those bits constantly. The changing and irregular dark bits from the random grey bitmaps are averaged by the eye as a grey background, so that instead of seeing clean back on white the eye sees black on grey. The grey background is changing constantly and thus somewhat annoying, but the text appears clearly. If, however, the user attempts to screen dump the window, the result is one of the two bitmaps with the cluttered background data. With a 25% dark bit density level these screen dumps can only be read with some annoyance by the human eye, and certainly not by an OCR program.

FIG. 1 illustrates a system for displaying a selected image in accordance with an embodiment of the invention. A user 1 of a display device 2, such as a monitor of a personal computer, communicates 3 through a network 4 with a server 5 that contains pairs of combined images consisting of an identical selected image, such as text, line art or other high-contrast artwork, for the pair and a different background random bitmap for each combined image. This background random bitmap includes bits of two contrasting shades, such as random black and white dots where a black or white selected image is used. It could also include random pairs of dots of two colors, such as green and red. The text must be the same color as one of the two colors used (e.g., red letters on a green and red background). The server 5 transmits over a transmission path 3 the pair of images for the image selected by the user to the display device 2. The display device 2, in the preferred embodiment, uses a plug-in, such as a Java program running in a browser such as Netscape, to alternately and successively display the pair of images. The selected image becomes apparent to the user 1 as occurring on a background, but an individual screen dump would acquire both the selected image and one of the two random backgrounds.

Figure 2A:
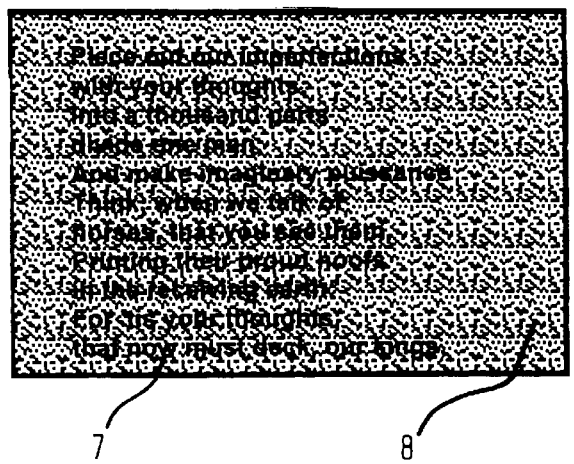
FIGS. 2A and 2B are diagrams of respective images which are combined to form the image shown in FIG. 2C in accordance with an embodiment of the invention.
Figure 2B:
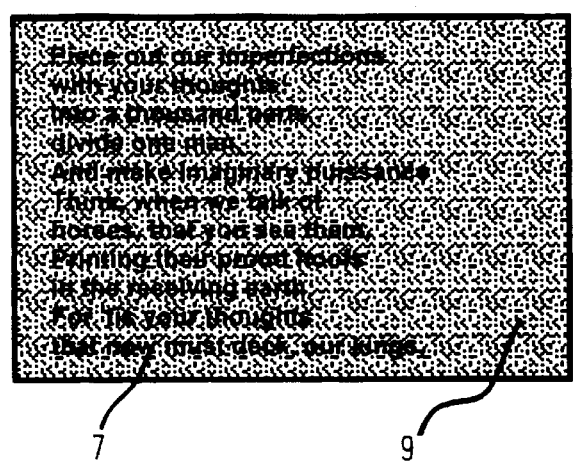
Figure 2C:
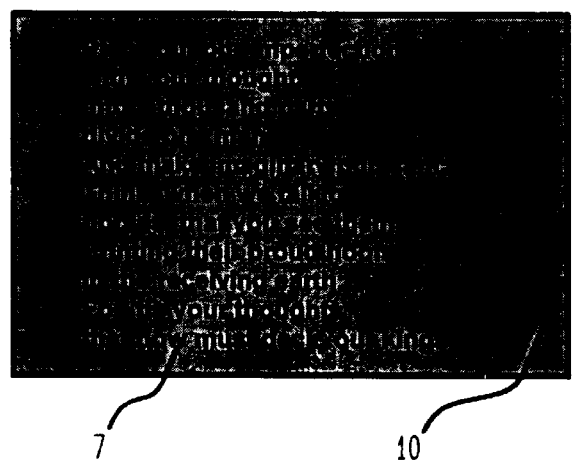

FIGS. 2A to 2C display a sample of text 7 with random background patterns 8 and 9 and the resulting appearance of the merged background 10. (The example text is from the Prolog to Shakespeare's Henry V.) On a sheet of paper, it is not possible to show the flickering, so the third image 2C is shown here as 100% black letters on a flat 50% grey background. However, if read on a screen with about 30 repeats per second, this third image 2C is roughly the appearance that results. An even higher flicker rate would be desirable; rates as low as 15 repeats per second cause the changing background to appear as an annoying Moire-like pattern, rather than as a steady grey level.

Some attention must be paid to the grey background density compared with the size of the letters. The larger the letters compared with the background and the fainter the apparent background, the more readable the separated images are. That is, for an image in which the letters are a normal screen size, adding 25% random bits may make it unreadable; whereas even 50% random bits may not render an image which is 8× normal size illegible. In short, it is not desirable in this system to let readers scale the images as large as they want; it increases the chance that simply cleaning up all isolated dots will leave a clean set of letter images behind.

Figure 3A:
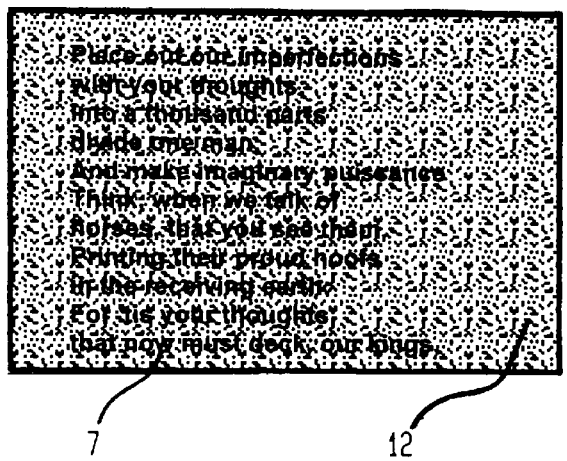
FIGS. 3A to 3C illustrate respective images generated using a lower density of background noise in accordance with another embodiment of the invention.
Figure 3B:
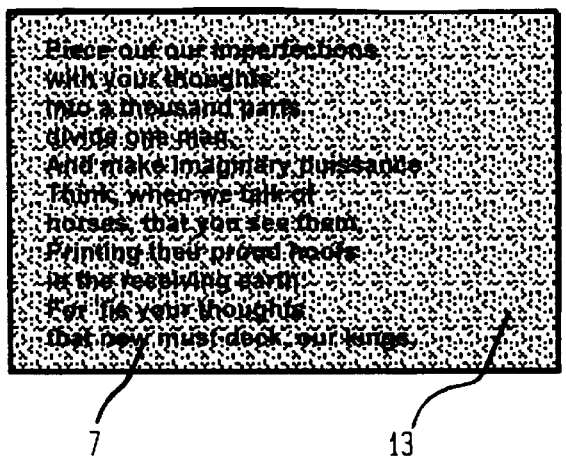
Figure 3C:
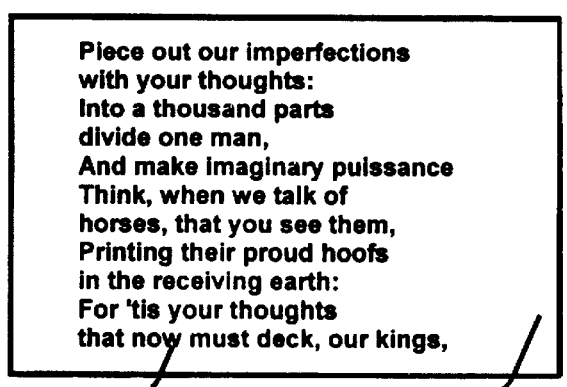

As noted, there are various choices in this system. The random bitmaps can have any grey level. In particular, as shown in FIGS. 3A to 3C, if the background black bit level 12 and 13 is about 10% within the two images 3A and 3B, the on-screen display 7 is easily readable on the resulting lighter background 14, but a reader can also easily make out the cluttered images 3A and 3B when isolated (note, however, that optical character recognition (OCR) programs still fail). If the background level is 50%, the display is now a fairly dark background but still quite readable when flickered. The individual cluttered images are then not even easily recognizable as text by eye, let alone readable.

Another embodiment of the invention is shown in FIGS. 4A to 4C. With this example, a flat white background is used that flickers between two images 16 and 17 of the text, each of which contain half the bits for each letter. This produces a different impression: instead of seeing black letters against a flickering grey background, the user sees flickering letters against a clean background. The half-images are recognizable as text 18 but not easy to read (and again won't make it through OCR). This form, with flickering letters, seems a little harder to read than the steady-letter, flickering-background form, and it is easier to imagine how it might be attacked with bit-cleanup techniques.

Finally, rather than using black and white bits, colored pairs of bits may be used. For example, red and green bits could be used, with the letters of the text made up of either red or green bits only. Use of color combinations such as red and green may allow clearly visible text to be produced at lower alternation rates.

An example of the kind of interface that is possible using the preferred embodiment is shown FIGS. 5 through 9. Using plug-ins, such as a program written in Java, the invention fetches files from a server machine and displays them on a user's screen. There are four levels of security which the interface can mimic; for demonstration purposes these are button-selected, but in reality the intellectual property owner would stipulate the degree of protection required.

Figure 5:
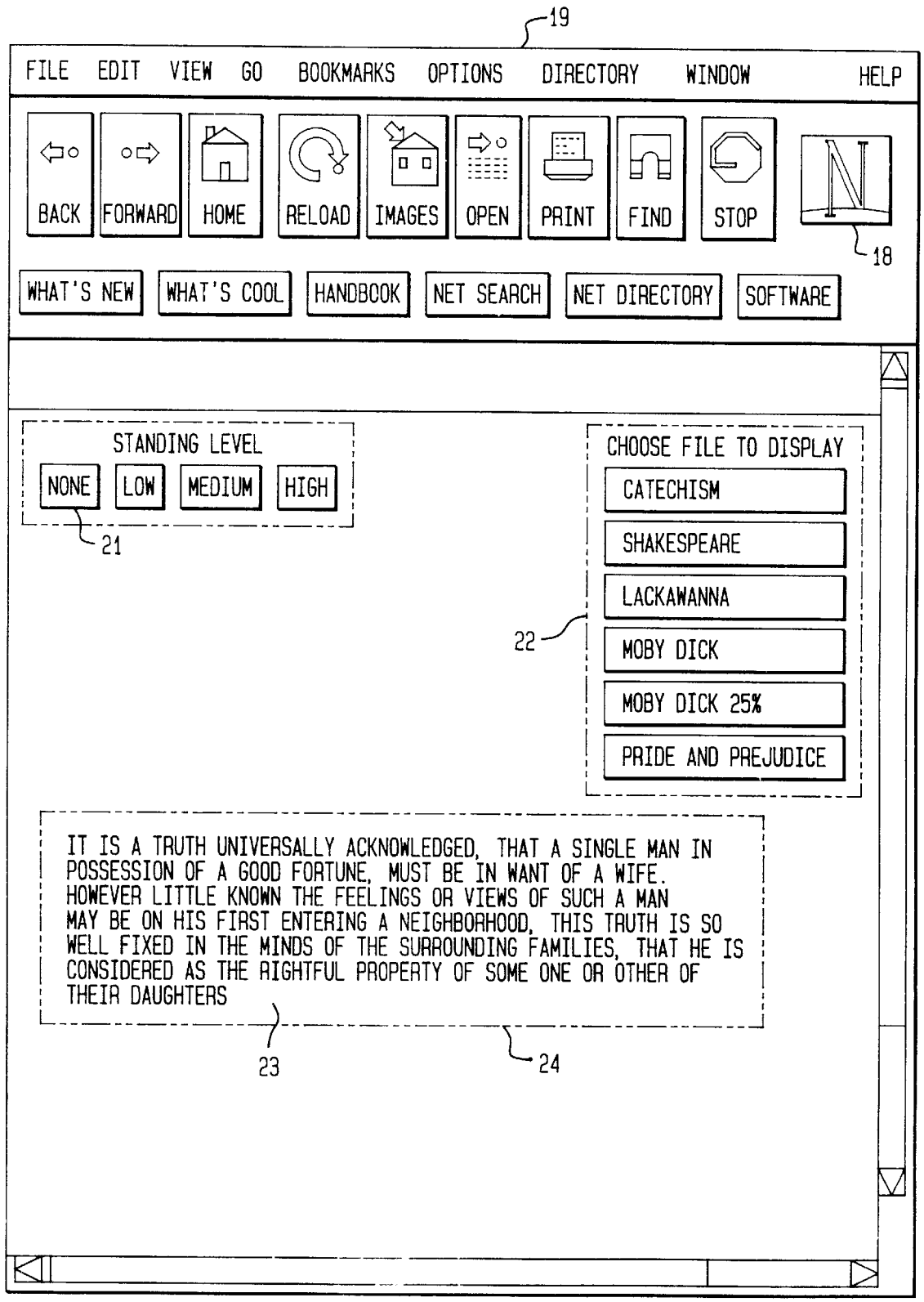
FIG. 5 is a diagram of a user interface containing the preferred embodiment for displaying an image in accordance with an embodiment of the invention.

FIG. 5 presents an example user interface that uses the preferred embodiment. In this example, the invention operates within a browser 18, such as Netscape, running in a Windows environment 19. A user selects a security level 20 and the type of file to display 22. Under "none" 21 security level 20, a file is simply displayed as readable black text 23 on a white background 24, with the only security consisting of no "save" button and the fact that moving the mouse out of the viewing window blanks the window (except for a message to put the mouse back in the window). This keeps only an extremely naive user from screen dumping the file.

FIG. 6 presents the same display, with the invention operating in Netscape 18 within a Windows environment 19. Selecting the "low" button 26 for the security level 20 presents an encrypted form of the text in black characters 27 (type of text selected by 22) on a white background 28 and asks for a password 29.

Figure 7:
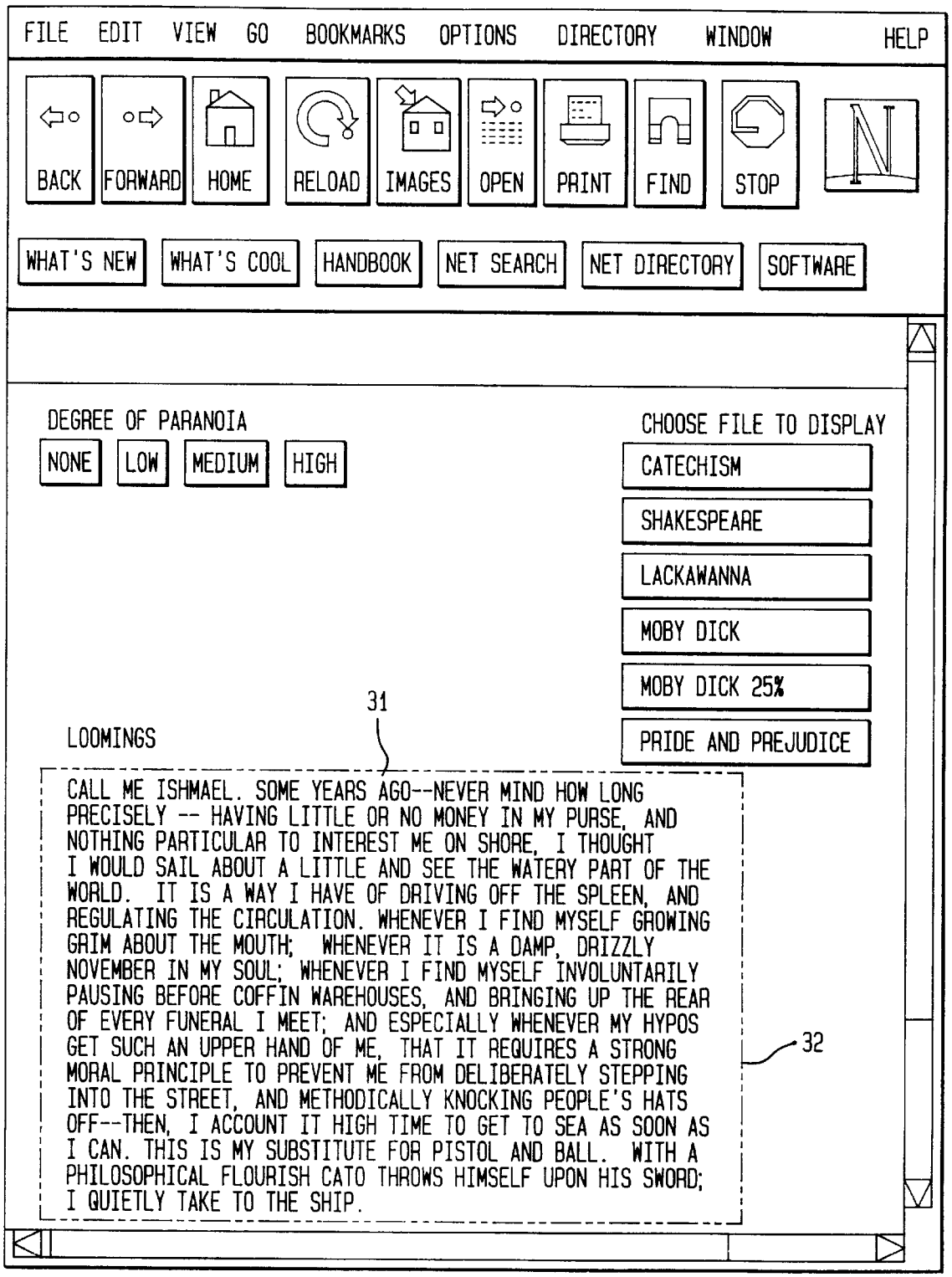

FIG. 7 shows the result of typing the correct password 29 using the "low" 26 security level 20. The text 31 is now presented in a readable format 32. If desired for additional restrictions, the passwords could be one-time use or otherwise limited in their capabilities, or the image could go away after some number of seconds.

"Medium" security 34 is presented in FIG. 8. "Medium" security 34 involves displaying the text in black characters 35 on a white background 36, with only a portion of the text in a readable format at a given time 37. The mouse must be moved up and down, in this case always keeping only three lines 37 decoded. With such an interface, screen dumping is difficult since the user would have to manually clip out the correct lines from each dump.

Figure 9:
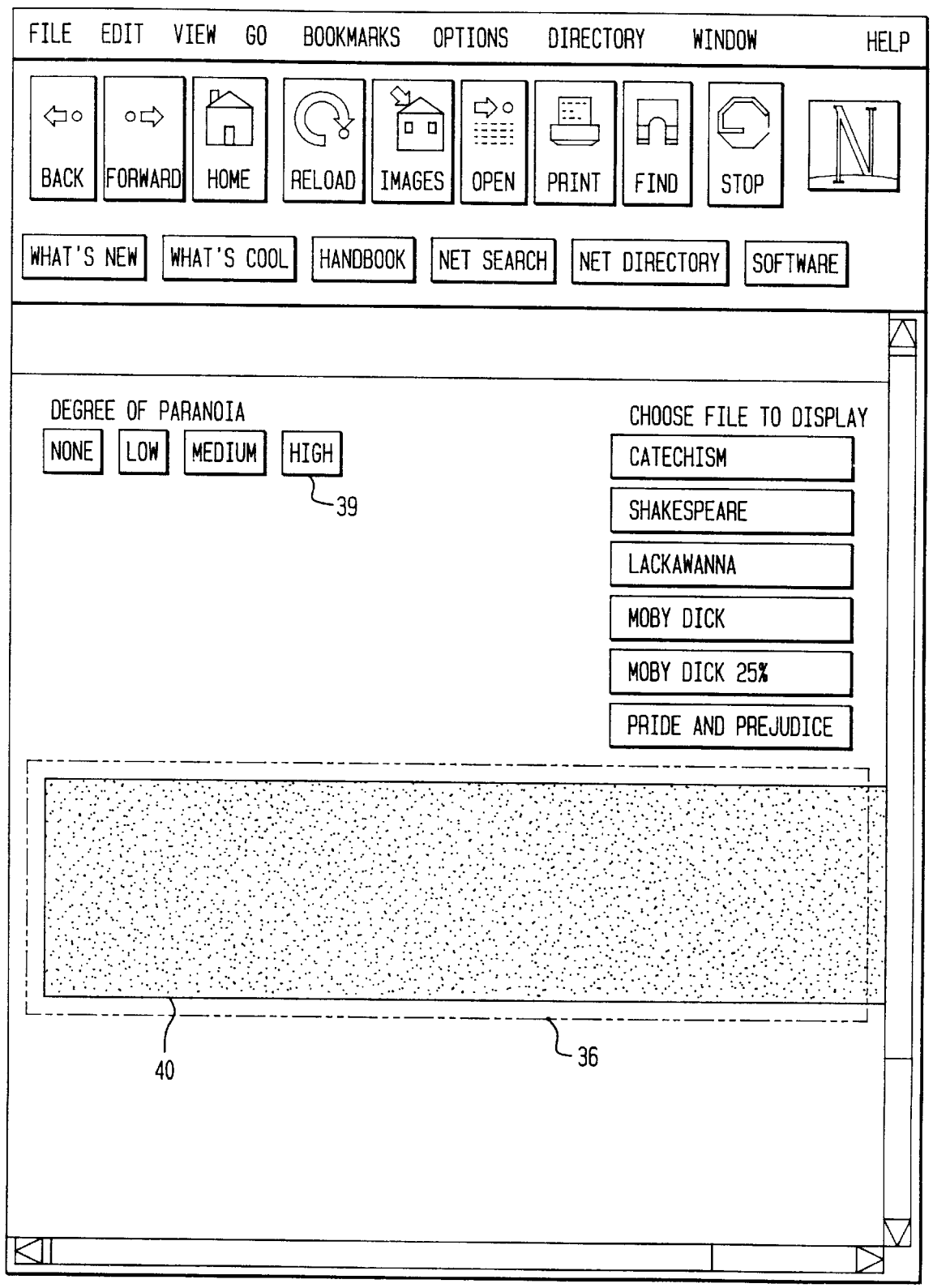
FIG. 9 is a diagram of a user interface containing the preferred embodiment for displaying an image in accordance with an embodiment of the invention.

Finally, FIG. 9 contains the preferred embodiment, which is presented as the "high" 39 security level 20. The appearance on the screen is of black characters 40 on a grey background 41. However, a screen dump presents the same black characters 40 with a black bitmap background, as was shown in 7 and 8 or 7 and 9 of FIG. 2.

This technology keeps users from doing many of the operations they would like to do, such as cut-and-paste or "egrep" searches on the files. Of course, it is the intent of this software to make these operations impossible without the copyright holder's permission; but it may be best if the user interface supports the operations which are not a threat to the copyright holder. For example, saving small quantities of information, or doing searches may be allowed by the interface and controlled as to quantity to prevent risk.

The invention has now been described in fulfillment of the foregoing objects. While several particular examples have been set forth by way of illustration, it will be appreciated that many modifications and alternative embodiments are possible without departing from the spirit and scope of the invention.

What is claimed is:

1. A medium for storing a program for displaying a selected image, said program:

generating a first background random bitmap;

generating a second background random bitmap;

adding said first background to said selected image to create a first combined image;

adding said second background to said selected image to create a second combined image; and displaying, alternately and in succession on a display device, said first combined image and said second combined image such that said selected image is recognizable to the human eye.

2. The medium of claim 1 wherein said program further successively repositions said combined images relative to the screen of said display device.

3. The medium of claim 1 wherein said medium is a magnetic storage medium.

4. The medium of claim 1 wherein said medium is an optical disk.

5. A method for preventing copying of an on-screen textual image having a bitmap background and bitmap text, the bitmap using two contrasting bits to represent the textual image, said method comprising the steps of:

adding random bits to the background of the textual image to produce a first bitmapped textual image;

adding random bits to the background of the textual image to produce a second bitmapped textual image; and alternately displaying said first bitmapped textual image and said second bitmapped image on the screen so that the instantaneous on screen image is unreadable.

6. The method according to claim 5 wherein said second bitmapped image is created by inverting said first bitmapped image.

7. The method according to claim 5 further comprising the step of wobbling said alternately displayed bitmapped textual images up and down on the screen.

8. The method according to claim 5 further comprising the step of encrypting said alternately displayed textual images before display to the user.

9. The method according to claim 5 wherein the textual image is high contrast art.

10. The method according to claim 5 wherein each of said background adding steps comprises the substeps of:

randomly adding dark bits to a clear background bitmap image to produce a random bitmapped background; and logically OR-ing said random bitmapped background with the bitmapped text to produce said first and second bitmapped textual images.

11. The method according to claim 10 wherein bits from the bitmapped text are randomly removed to form random bitmapped text having half the textual information.

12. The method according to claim 10 wherein only one out of every four bits added is dark.

13. The method according to claim 12 wherein the dark bits are black and the clear background image is white.

14. The method according to claim 12 wherein the dark bits are red and the clear background image is green.

15. A method for preventing copying of an on-screen textual image having bitmapped text, the bitmap using a dark bit and a clear bit to represent the textual image, said method comprising the steps of:

randomly modifying the bitmapped text to form a first bitmapped textual image;

randomly modifying the bitmapped text to form a second bitmapped textual image;

alternately flickering said second and first bitmapped textual images on a bitmapped background on the screen so that the instantaneous on screen is display unreadable.

16. The method according to claim 15 wherein said random modification step further comprises the substep of randomly removing dark bits from the text bitmapped image to produce said first and second bitmapped textual images having half the textual information.

17. The method according to claim 16 wherein the bitmapped background comprises a clear bitmapped image.

18. The method according to claim 15 wherein said flickering step includes the substep of randomly adding dark bits to a clear background bitmap image to produce the bitmapped background.

19. The method according to claim 18 further comprising the step of wobbling said alternately flickered textual images up and down on the screen.

20. The method according to claim 18 wherein only one out of every four bits added is dark.

21. A system for preventing copying of on screen bitmapped images having bitmapped text and a bitmapped background, said system comprising:

a display device;

a communications network; and a server having pairs of the bitmapped images that are to be displayed on said display device, each of said bitmapped image pairs being alternately transmitted by said server over said communications network to said display device.

22. A system according to claim 21 wherein said server further includes:

means for randomly adding bits to the background of the bitmapped image to produce a random background bitmap; and means for logically OR-ing said random background bitmap with the bitmapped text.

23. A system according to claim 22 wherein said server further includes:

means for randomly removing bits from the bitmapped text to produce a random text bitmap; and means for alternately flickering random text bitmap pairs against a bitmap background.

24. A system according to claim 23 wherein said server further includes means for slowly wobbling the text displayed to the user's screen up and down and encrypting the text displayed at the user.

\* \* \* \* \*